Nov. 10, 1959   J. BAUER ET AL   2,911,981
MACHINES FOR LOOSENING TOBACCO BALES
Filed April 1, 1958   2 Sheets-Sheet 1

INVENTOR.
Joseph Bauer & Hubert Schloßmacher
BY Singer, Stern & Carlberg
Attorneys

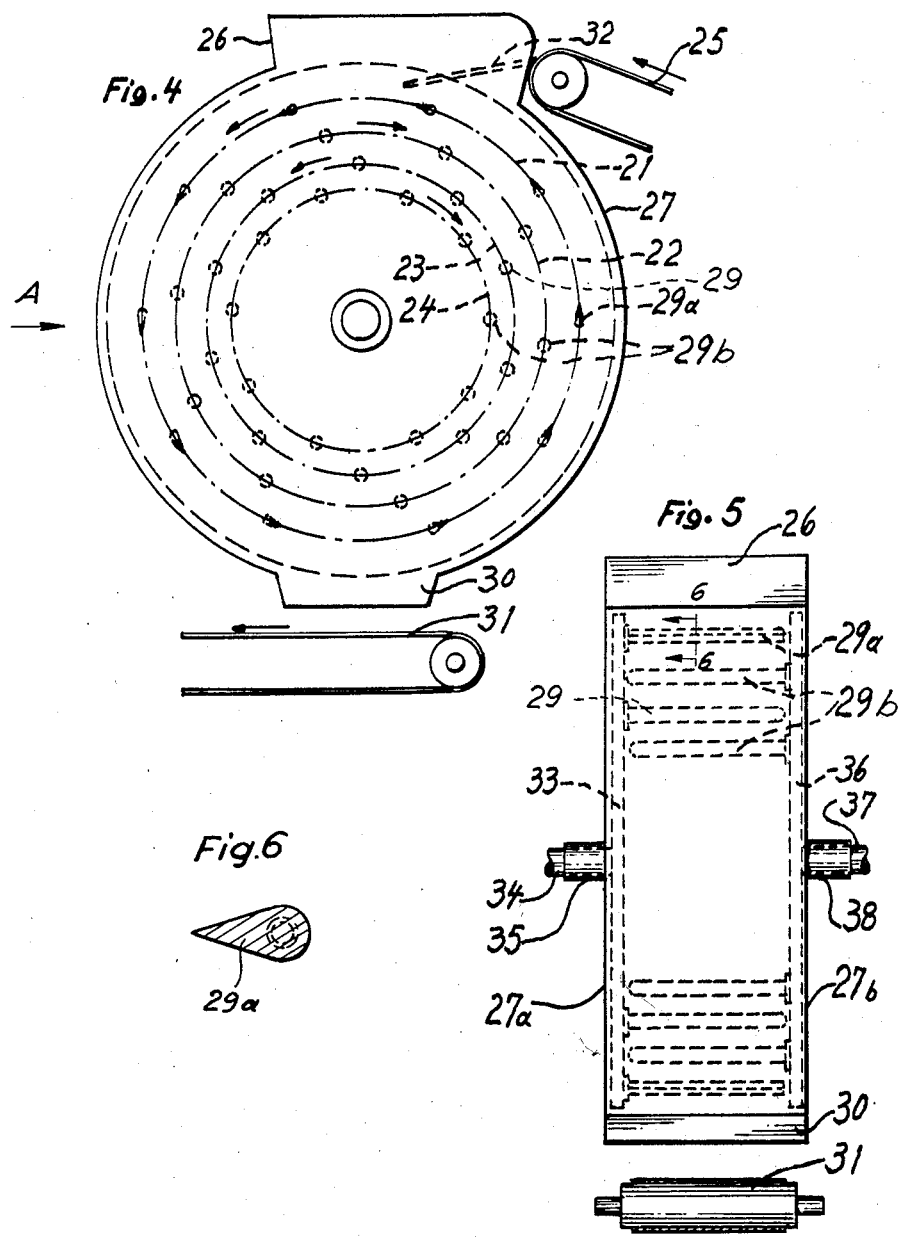

United States Patent Office 2,911,981
Patented Nov. 10, 1959

2,911,981

MACHINES FOR LOOSENING TOBACCO BALES

Joseph Bauer, Trier, Mosel, and Hubert Schlossmacher, Hamburg-Bergedorf, Germany, assignors to Hauni-Werke Körber & Co. K.G., Hamburg-Bergedorf, Germany Application April 1, 1958, Serial No. 725,526

Claims priority, application Germany April 5, 1957

8 Claims. (Cl. 131—149)

The invention relates to tobacco treating machines and in particular is directed to a machine for loosening tobacco bales.

It is an object of the invention to employ for the purpose of loosening tobacco bales a rotary cage drum device consisting of at least two concentrically arranged cylindrical cages, to one point of the circumference of which the tobacco bales are fed to be loosened when the bales or portions of the bales are engaged by the bars of the cages while the loosened tobacco leaves the machine at another point of the circumference of the device and discharges the loosened tobacco upon a conveyor which moves the loosened tobacco away from the rotary cage drum device.

Another object of the invention is to provide the machine with at least two concentrically arranged cylindrical cages of which the circumference of each cage consists of a number of circumferentially spaced bars, all of which are positioned parallel to the common axis of rotation of the cages.

Still another object of the invention is to rotate the concentrically arranged cylindrical cages in such a manner that they perform a relative movement with respect to each other, which relative movement is performed in such a manner that the cylindrical cages rotate in opposite direction with reference to each other.

Furthermore, there is arranged between each two concentrically arranged cylindrical cages a suitably dimensioned annular space into which the loosened tobacco enters which has passed through the spaces between the bars of one drum before it comes into engagement with the bars of the following drum in order to pass through the spaces formed between the bars of each succeeding cylindrical cage.

It is another object of the present invention to provide within the innermost cylindrical cage a stripping pendulum which is rotatable about the axis of rotation of the cylindrical cages and is provided with a stripping bar arranged parallel and close to the inner circumference of the innermost drum and is maintained in a suspended vertical position by gravity.

Still another object of the invention is to feed the tobacco bales to be loosened into one end of the rotary cage drum arrangement, namely into one end of the innermost cylindrical cage or, as will be described in connection with another embodiment of the invention, to feed the tobacco bales to be loosened to the outermost cylindrical cage, namely to the circumference of the same, in which case the bars of the outermost cage are constructed to act as scraper knives or are provided with knife-like edges which engage the tobacco bales and peel the tobacco leaves from the latter. When the tobacco bales are fed to the circumference of the outermost cylindrical cage each end of all the cages is provided with a rotary disc provided each with an outwardly extending stub shaft mounted in bearings on both end walls of the housing of the machine. The arrangement of the drive mechanism for these stub shafts is such that the rotary disc of one drum is rotated in an opposite direction to the disc of the next adjacent cage, so that each two adjacent rows of bars are rotated in opposite directions.

Other objects of the invention will become apparent on hand of the following specification. The accompanying drawings illustrate, by way of example, two embodiments of the invention. It is understood, however, that the construction of machines as described according to the present invention may be changed without departing from the spirit and scope of the invention.

Referring to the drawings:

Fig. 4 is an end elevation view of a modified embodiment of a machine for loosening tobacco bales in which four cylindrical cages are employed, and Fig. 5 is a side elevation view of the machine in the direction of arrow A of Fig. 4; whereby for clearance two pairs of the bars of the two rotary cylindrical cages each are shown in a vertical plane.

Fig. 6 is a vertical section taken on line 6—6 of Fig. 5.

Figure 1:
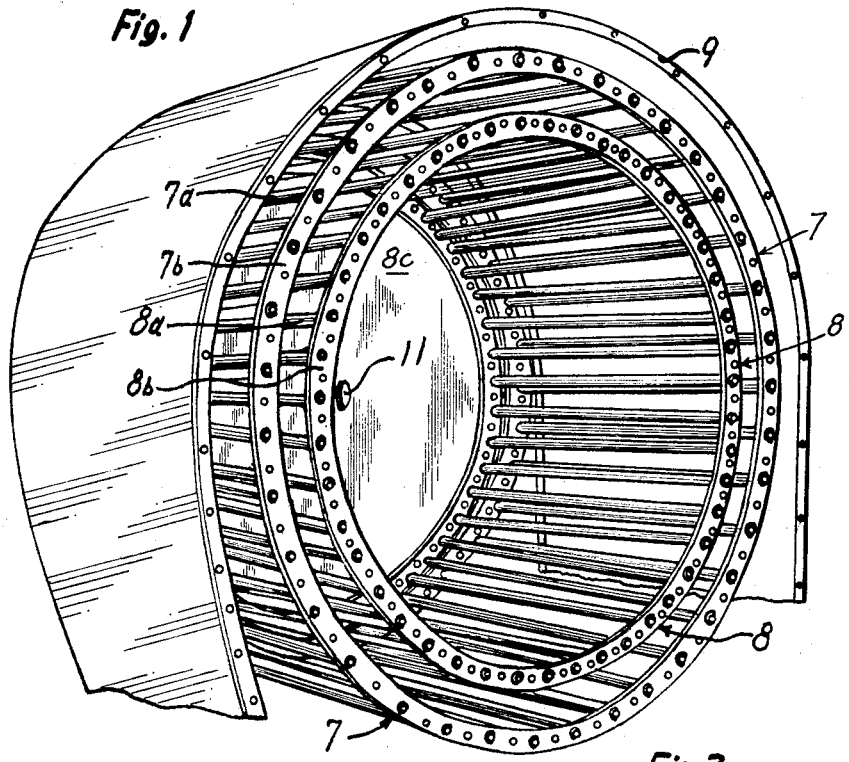
Fig. 1 is a perspective view of a machine for loosening tobacco bales provided with two opposite rotating cylindrical cages and in which the tobacco to be loosened is fed into the open end of the innermost cylindrical cages the pendulum means being omitted.
Figure 2:
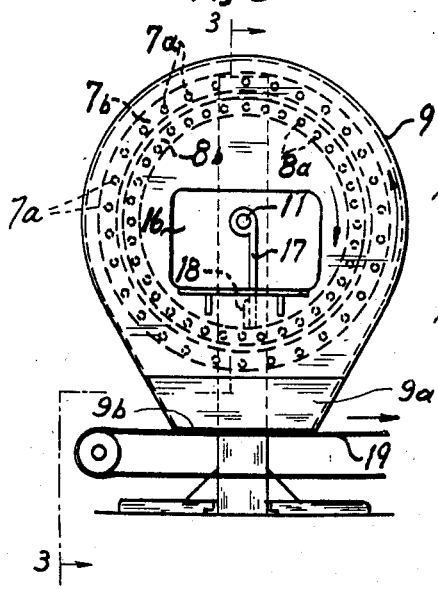
Fig. 2 is an end view of the machine.
Figure 3:
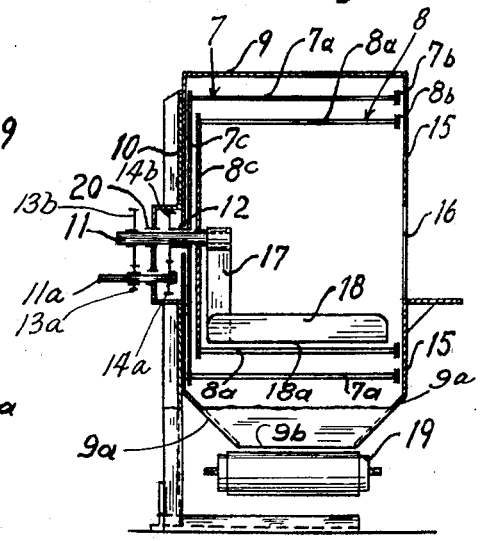
Fig. 3 is a sectional view of the machine substantially along the lines 3—3 of Fig. 2; whereby for clearance only four bars are shown and also the vertical lines referring to the ring-elements have been omitted.

Referring to the first embodiment of the invention as illustrated in Figs. 1 to 3, there are provided two oppositely rotating cylindrical cages or drums 7 and 8 in a housing 9 whose upper portion surrounds the outermost cage and whose lower portion is reduced in cross section and forms a funnel-shape outlet 9a having a discharge aperture 9b arranged directly above the upper portion of a horizontally arranged endless conveyor 19. Each one of the circumferences of the rotary cages 7 and 8 is formed by circumferentially spaced bars 7a and 8a respectively, which are arranged parallel to the axis of rotation of the cages 7 and 8 whose common axis of rotation is horizontally arranged. The cages 7 and 8 are each provided at one of their ends with a closure wall 7c and 8c, respectively, which is rotatably supported in a bearing structure 20 attached to the end wall 10 of the housing 9. The free ends of the bars 7a and 8a which face the open side of the housing 9 are connected with each other by ring elements 7b and 8b respectively. The innermost cage 8 is mounted by means of its closure wall 8c on a drive shaft 11 which is rotatably supported in the tubular drive shaft 12 connected to the closure wall 7c of the outer cage 7. The drive shafts 11 and 12 are rotated by means of gearings 13 and 14 in such a manner that a single driving shaft rotates both cages 7 and 8 in opposite directions. The housing 9 is provided adjacent the open ends of the cages with an end wall 15 which latter is provided with the feed aperture 16 for the admission of tobacco bales to be loosened.

As particularly illustrated in the Figs. 2 and 3 the drive shaft 11 has loosely and rotatably mounted thereon a stripper pendulum 17 suspended from the projecting portion of the shaft 11 which extends into the inner cage wall 8c. This pendulum 17 is provided at its lowermost end with a stripper bar 18 which extends almost over the entire width of the inner cage 8 and is arranged closely to the inner circumference of the inner cage 8 with its lower sharpened edge 18a presented to the bars 8a of the cage 8.

For the purpose of loosening tobacco bales the same are charged into the feed opening 16 and into the interior of the inner cage 8 which in the present case is rotated in clockwise direction. When the tobacco bale drops into the cage 8 it will cause a swinging movement of the stripper pendulum 17 also in clockwise direction. The tobacco bale therefore will roll along the bars 8a of the inner cage 8 and the bar 18 of the stripper pendulum 17 will prevent the inner cage 8 from rotating the tobacco bale in an upward clockwise direction beyond a predetermined angular position. This treatment of the leafy tobacco material is a very gentle one and prevents portions of the leafy material which are still very heavy from being conveyed by the bars 8a too high and this again prevents the material from dropping and falling downwardly from a relatively high position. The portions of the leafy material which pass through the spaces between the bars 8a of the inner cage 8 are engaged by the oppositely moving bars 7a of the outer cage 7 and are further loosened. Finally, the thoroughly loosened leafy material drops through the spaces between the bars 7a of the outer cage 7 into the funnel-shaped outlet 9a at the lower end of the housing 9 and directly upon a suitable conveyor device such as the endless conveyor belt 19 as shown in the Figs. 2 and 3.

Figures 4 and 5 illustrate a modified embodiment of the machine which is equipped with four concentrically arranged rotary cylindrical cages 21, 22, 23 and 24 similar in construction to the cages 7 and 8 shown in Figures 1 to 3 inclusive. The circularly arranged cages 21 and 23 are provided with circumferentially arranged bars 29a and 29 respectively, and one end of each of these bars is secured to a common rotary disc 33. The other concentrically arranged cages 22 and 24 are provided with individual bars 29b with one of their ends secured to a common rotary disc 36. The rotary discs 33 and 36 are each provided with a stub shaft 34 and 37, respectively, which are rotatably supported in bearings 35 and 38 respectively, mounted on the oppositely arranged end walls 27a and 27b of the housing 27. The two rotary discs 33 and 36 are rotated in opposite direction so that each two adjacent circular series of bars rotate in opposite direction.

In this last mentioned machine the tobacco bales are supplied or fed to the outer circumference of the outermost series of bars 21. For this purpose the bales are conveyed by a conveyor belt 25 onto a chute 32 arranged within the upper feed funnel 26 of the housing 27. The individual bars 29a of the outermost series of cages 21 are constructed as scraper blades shown in detail in Figure 6 which remove the tobacco leaves from the tobacco bale in layers and these removed tobacco layers are successively conducted to the next series of bars 29b arranged within and below the outermost scraper bars 29a. The tobacco therefore passes successively through the spaces formed between the series of cages 22, 23 and 24 each of which is provided with the individual bars 29a, 29b, 29 and 29b so that the tobacco layers removed from the bale by the scraper blades 29a are thoroughly loosened. The loosened material is discharged from the housing 27 through the lower funnel-shaped discharge portion 30 and drops upon the conveyor belt 31 which conveys the loosened tobacco away from the machine.

The radial distances between the individual bars in each one of the cages and the circumferential spaces between the circularly arranged series of bars 29, 29a and 29b is so selected that the tobacco reaches the discharge portion 30 of the housing 27 in the desired loosened condition. When the tobacco leaf material is not too heavy the machine of the present invention will properly loosen the leafy material as it is desired for immediate further treatment of the tobacco so that additional loosening devices are unnecessary.

What we claim is:

1. In a machine for loosening tobacco bales, a housing, a plurality of concentrically arranged cylindrical cages rotatably mounted about a common horizontal axis in said housing, said cylindrical cages including each a series of circumferentially spaced bars arranged parallel to said common axis of rotation, and means for rotatably supporting said cylindrical cages so that the bars of one cage can be moved relatively to the bars in the next adjacent cage, said supporting means being offset axially from a central vertical plane through said housing to provide an unobstructed central area within said cages.

2. In a machine for loosening tobacco bales, a housing, a plurality of concentrically arranged cylindrical cages rotatably mounted about a common horizontal axis in said housing, said cylindrical cages including each a series of circumferentially spaced bars arranged parallel to said common axis of rotation, means for rotatably supporting said cages at a point offset from a central vertical plane extending through said housing to provide a central unobstructed area within said concentrically arranged cages and means for rotating said plurality of concentrically arranged cylindrical cages in such a manner that when one cage rotates in one direction the cage having the next smaller diameter rotates in the opposite direction.

3. In a machine for loosening tobacco bales, a housing, a plurality of concentrically arranged cylindrical cages rotatably mounted about a common horizontal axis in said housing, said cylindrical cages including each a series of circumferentially spaced bars arranged parallel to said common axis of rotation, means for rotatably supporting said cages at a point offset from a central vertical plane extending through said housing to provide a central unobstructed area within said concentrically arranged cages, and means for rotating said plurality of concentrically arranged cylindrical cages in such a manner that when one cage rotates in one direction the cages having the next smaller and next greater diameter rotate in the opposite directions with the same speed.

4. In a machine for loosening tobacco bales, a housing, a plurality of concentrically arranged cylindrical cages rotatably mounted about a common horizontal axis in said housing, said cylindrical cages including each a series of circumferentially spaced bars arranged parallel to said common axis of rotation, said series of circumferentially spaced bars in said plurality of concentrically arranged cylindrical cages being radially spaced from one another to form annular spaces for receiving loosened tobacco passing through the spaces between each said series of circumferentially spaced bars, and means for rotatably supporting said cylindrical cages so that the bars of one cage are adapted to be moved relatively to the bars in the next adjacent cage, means for rotatably supporting said cages at a point offset from a central vertical plane extending through said housing to provide a central unobstructed central area within said concentrically arranged cages.

5. In a machine for loosening tobacco bales, a housing having two spaced parallel end walls and a substantially circular wall therebetween, a plurality of concentrically arranged cylindrical cages rotatably mounted about a common horizontal axis in said housing and between said end walls, each of said cylindrical cages including a circular end wall and circumferentially spaced bars attached with one of their ends to said circular end wall, means for rotatably supporting said circular end walls in one of said two parallel end walls, ring members connecting the other ends of said bars with one another, said other one of said two parallel end walls having an opening for introducing the tobacco bales to be loosened into the interior of the innermost cylindrical cage, and means for rotating said circular end walls with the bars thereon in such a manner that the bars of one cylindrical cage move in a circular path relatively to the bars of the next adjacent cage having a different diameter, said rotatably supporting means being offset to one side of a central plane extending vertically through said housing to provide an unobstructed central area within said concentrically arranged cages.

6. A machine for loosening tobacco bales according to claim 5, in which a scraper pendulum is supported within said central area, means for rotatably suspending said scraper pendulum about said common horizontal axis and within the innermost cylindrical cage, and a scraper bar on said pendulum and arranged parallel to the bars of said innermost cage and close to the inner circumference of said cage.

7. In a machine for loosening tobacco bales, a housing, a plurality of concentrically arranged cylindrical cages rotatably mounted about a common horizontal axis in said housing, said cylindrical cages including each a series of circumferentially spaced bars arranged parallel to said common axis of rotation, a feed opening at the upper portion of said housing and a discharge opening for the loosened tobacco at the lower portion of said housing, and said feed opening feeding the tobacco bales towards the upper circumferential portion of the outermost cylindrical cage, the bars of said outermost cage being provided with a scraper edge, and means for rotatably supporting said cylindrical cages so that the bars of one cage can be moved relatively to the bars in the next adjacent cage.

8. In a machine for loosening tobacco bales, a housing having two spaced parallel end walls and a substantially circular wall therebetween, a plurality of concentrically arranged cylindrical cages rotatably mounted about a common horizontal axis in said housing and between said end walls, said cylindrical cages including two axially spaced circular end walls and a plurality of contrically arranged series of circumferentially spaced bars, one end of alternate series of said circumferentially spaced bars being fixedly attached to one of said circular end walls, and one end of the other series of said circumferentially spaced bars being fixedly attached to the other one of said two circular end walls, and means for rotatably supporting said circular end walls with said concentrically arranged series of circumferentially spaced bars thereon in such a manner that they can be rotated in opposite directions.

References Cited in the file of this patent
UNITED STATES PATENTS

| | | |
|---|---|---|
| 108,692 | Dusch | Oct. 25, 1870 |
| 160,884 | Davids | Mar. 16, 1875 |
| 167,742 | Caldwell | Sept. 14, 1875 |
| 2,211,570 | Kennedy et al. | Aug. 13, 1940 |